United States Patent
Komoguchi et al.

(10) Patent No.: US 9,064,408 B2
(45) Date of Patent: Jun. 23, 2015

(54) REAR CROSS TRAFFIC ALERT DEVICE

(75) Inventors: Tetsuya Komoguchi, Nagakutecho (JP);
Tomoya Kawasaki, Miyoshi (JP);
Yoshihiko Takahashi, Miyoshi (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 104 days.

(21) Appl. No.: 14/008,191

(22) PCT Filed: Sep. 26, 2011

(86) PCT No.: PCT/JP2011/005389
§ 371 (c)(1),
(2), (4) Date: Sep. 27, 2013

(87) PCT Pub. No.: WO2013/046246
PCT Pub. Date: Apr. 4, 2013

(65) Prior Publication Data
US 2014/0015693 A1    Jan. 16, 2014

(51) Int. Cl.
*G08G 1/01* (2006.01)
*G08G 1/056* (2006.01)
*G08G 1/16* (2006.01)
(Continued)

(52) U.S. Cl.
CPC ............... *G08G 1/056* (2013.01); *G08G 1/167* (2013.01); *G01S 13/931* (2013.01); *G01S 2013/9332* (2013.01); *G01S 2013/9389* (2013.01); *B60Q 9/006* (2013.01); *G08G 1/166* (2013.01); *B60Q 9/008* (2013.01); *G01S 2013/9378* (2013.01); *G01S 2013/9385* (2013.01)

(58) Field of Classification Search
CPC .......... G01S 13/931; G01S 2013/9332; G01S 2013/9385; G08G 1/16

USPC ................... 340/935, 435, 436, 903; 701/301
See application file for complete search history.

(56) References Cited

U.S. PATENT DOCUMENTS

| 7,346,453 | B2 * | 3/2008 | Matsuoka ..................... 701/301 |
| 7,477,137 | B2 * | 1/2009 | Matsumoto et al. .......... 340/436 |
| 7,830,243 | B2 * | 11/2010 | Buckley et al. ............... 340/435 |

(Continued)

FOREIGN PATENT DOCUMENTS

| DE | 10 2006 047 6 A1 | 4/2008 |
| JP | 10-166976 A | 6/1998 |

(Continued)

OTHER PUBLICATIONS

International Search Report Issued Oct. 18, 2011 in PCT/JP11/005389 Filed Sep. 26, 2011.

*Primary Examiner* — John A Tweel, Jr.
(74) *Attorney, Agent, or Firm* — Oblon, McClelland, Maier & Neustadt, L.L.P.

(57) ABSTRACT

Provided is a rear cross traffic alert device that allows a driver to understand that notification of the presence of an object (another vehicle, etc.) in an area directly behind the vehicle cannot be notified. The rear cross traffic alert device provided on a vehicle includes: an object detection section configured to detect the presence of an object laterally behind the vehicle; a movement determination section configured to determine whether or not the object has entered a predetermined area in a detection area in which the object detection section can detect the presence of the object; and a notification control section configured to stop notification when the movement determination section has determined that the object has entered the predetermined area.

8 Claims, 8 Drawing Sheets

(51) Int. Cl.
 *G01S 13/93* (2006.01)
 *B60Q 9/00* (2006.01)

(56) References Cited

U.S. PATENT DOCUMENTS

| | | |
|---|---|---|
| 2006/0250224 A1 | 11/2006 | Steffel et al. |
| 2006/0287828 A1 | 12/2006 | Lehner |
| 2010/0117813 A1 | 5/2010 | Lee |
| 2010/0271237 A1 | 10/2010 | Reed et al. |
| 2013/0100287 A1* | 4/2013 | Chien et al. .................. 348/148 |

FOREIGN PATENT DOCUMENTS

| | | |
|---|---|---|
| JP | 2008 129974 | 6/2008 |
| JP | 2009 149249 | 7/2009 |
| JP | 2013 73363 | 4/2013 |
| WO | 2006 089624 | 8/2006 |

* cited by examiner

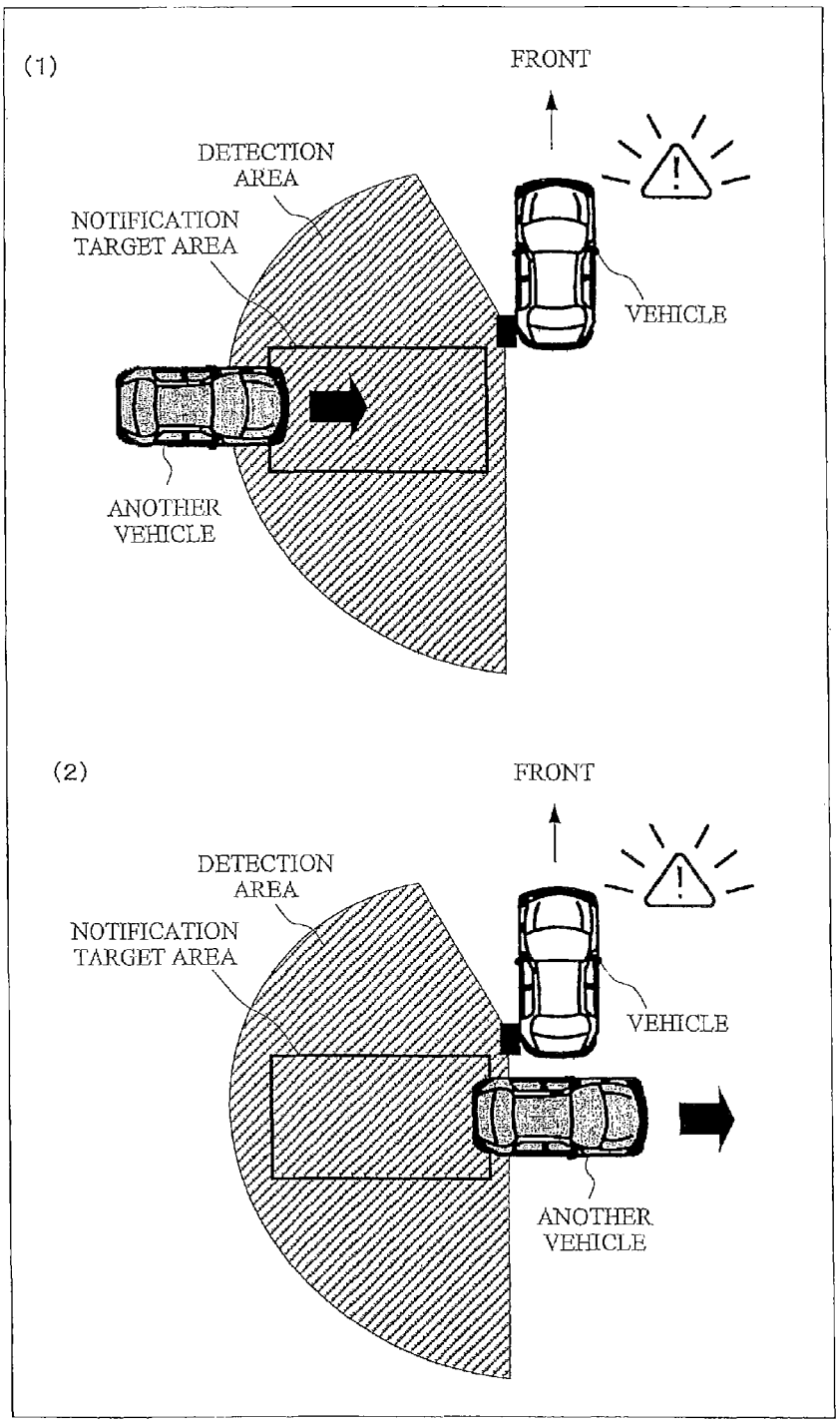

REAR CROSS TRAFFIC ALERT DEVICE

TECHNICAL FIELD

The present invention relates to a rear cross traffic alert device provided on a vehicle such as an automobile for detecting an object (another vehicle, etc.) laterally behind the vehicle and notifying a driver accordingly, and more particularly, to notification control of the rear cross traffic alert device in the case where another vehicle enters an area directly behind the vehicle.

BACKGROUND ART

Many of recent vehicles have a rear cross traffic alert device for notifying a driver of the presence of another vehicle, etc. in a right/left area laterally behind the vehicle which is a dead area for a driver (notification area). The rear cross traffic alert device detects another vehicle approaching the notification area at the right or left laterally behind the vehicle by a millimeter-wave radar or the like, and when the other vehicle has entered the notification area, notifies (alerts) the driver of the presence of the other vehicle (for example, Patent Literature 1).

In addition, according to the rear cross traffic alert device disclosed in Patent Literature 1, when the vehicle having the rear cross traffic alert device is to be parked, the notification area (detection angle for notification target) laterally behind the vehicle is changed in accordance with the entry angle of the vehicle to a parking space upon the parking, whereby notification about a necessary area can be performed without notification about an unnecessary area.

CITATION LIST

Patent Literature

[PTL 1] US2010/0271237

SUMMARY OF THE INVENTION

Problems to be Solved by the Invention

However, such a rear cross traffic alert device as disclosed in Patent Literature 1 ends the notification after the other vehicle moves out of the notification area, or ends the notification after the notification has continued for a certain period. Therefore, for example, in the case where another vehicle laterally passes from the left to the right behind the vehicle, the rear cross traffic alert device of the vehicle, after performing notification of the presence of the other vehicle entering the left notification area laterally behind the vehicle, continues the notification until the other vehicle moves out of the notification area. Therefore, just before the other vehicle moves out of the left notification area laterally behind the vehicle, a situation occurs in which notification is being performed though the other vehicle has already entered an area directly behind the vehicle. Therefore, a driver might recognize that the rear cross traffic alert device can detect the presence of another vehicle directly behind the vehicle and perform notification thereof.

However, the rear cross traffic alert device is intended to notify the presence of another vehicle in a blind spot which is laterally behind the vehicle and is likely to be a dead area for the vehicle, and therefore, originally, cannot detect the presence of another vehicle in an area directly behind the vehicle. Therefore, for example, notification of the presence of another vehicle travelling toward the vehicle from directly behind the vehicle cannot be performed. However, drivers do not necessarily understand such an original mechanism of the rear cross traffic alert device. Then, a driver who recognizes that the rear cross traffic alert device can detect the presence of another vehicle directly behind the vehicle and perform notification thereof as described above might believe that, if notification is not performed, there is no other vehicle directly behind the vehicle. Therefore, for example, when the driver backs the vehicle upon vehicle operation before or after parking, the driver might recognize that there is no other vehicle directly behind the vehicle because the rear cross traffic alert device does not perform notification, so that the driver might neglect looking behind.

Therefore, an object of the present invention is to provide a rear cross traffic alert device that allows a driver to understand that notification of the presence of an object (another vehicle, etc.) in an area directly behind the vehicle cannot be notified.

Solution to the Problems

In order to achieve the above object, the present invention employs the following configuration. That is, the first aspect is a rear cross traffic alert device provided on a vehicle, for notifying the presence of an object approaching an area laterally behind the vehicle. The rear cross traffic alert device includes: an object detection section configured to detect the presence of the object present laterally behind the vehicle; a movement determination section configured to determine whether or not the object has entered a predetermined area in a detection area in which the object detection section can detect the presence of the object; and a notification control section configured to stop notification when the movement determination section has determined that the object has entered the predetermined area.

In the second aspect based on the first aspect, the rear cross traffic alert device further includes a target area setting section configured to set, in the detection area, a notification stop area as the predetermined area, and a notification target area which does not overlap with the notification stop area. The movement determination section determines whether or not the object has entered the notification stop area from the notification target area. The notification control section stops notification when the movement determination section has determined that the object has entered the notification stop area from the notification target area.

In the third aspect based on the second aspect, the target area setting section sets the notification stop area to an area that is adjacent, in the width direction of the vehicle, to a rear undetectable area behind the vehicle in which the object detection section cannot detect the presence of the object.

In the fourth aspect based on the second aspect, the movement determination section determines that the object has entered the notification stop area from the notification target area, when the object having been detected in the notification target area and not having been detected in the notification stop area is detected at least in the notification stop area.

In the fifth aspect based on the second aspect, the movement determination section determines whether or not the object has moved out of the notification stop area and completely moved into the notification target area, and the notification control section starts notification when the movement determination section has determined that the object has moved out of the notification stop area and completely moved into the notification target area.

In the sixth aspect based on the fifth aspect, the movement determination section determines that the object has moved out of the notification stop area and completely moved into the notification target area, when the object having been detected at least in the notification stop area is detected in the notification target area and not detected in the notification stop area.

In the seventh aspect based on the second aspect, when the object detection section has detected a plurality of different objects, the movement determination section determines, for each object, whether or not the object is detected in the notification target area and not detected in the notification stop area, and the notification control section does not stop notification when the movement determination section has determined that at least one of the plurality of objects is detected in the notification target area and not detected in the notification stop area.

In the eighth aspect based on the third aspect, the target area setting section sets the notification stop area to an area between the notification target area and the rear undetectable area so as to be adjacent to the notification target area and the rear undetectable area in the width direction of the vehicle.

In addition, in order to achieve the above object, processing performed by each component of the rear cross traffic alert device of the present invention described above can be also realized as a control method for the rear cross traffic alert device, which gives a series of processing steps. This method is provided in form of program allowing a computer to execute a series of processing steps. The program may be stored in a computer-readable storage medium and then installed into a computer.

Advantageous Effects of the Invention

According to the first aspect, when an object (for example, another vehicle) approaching an area laterally behind the vehicle has entered a predetermined area in the detection area laterally behind the vehicle, notification by the rear cross traffic alert device is stopped. Therefore, thereafter, even if the other vehicle has further moved to the rear undetectable area of the vehicle, notification is not executed. Therefore, a driver does not recognize that notification of the presence of another vehicle in the rear undetectable area of the vehicle is performed, and instead, can recognize that the rear cross traffic alert device cannot perform notification of the presence of another vehicle in an area (rear undetectable area) directly behind the vehicle.

According to the second aspect, for example, when another vehicle has moved from the notification target area to the notification stop area in the detection area laterally behind the vehicle, notification by the rear cross traffic alert device is stopped. That is, if another vehicle has moved to the notification stop area laterally behind the vehicle, notification is stopped. Therefore, thereafter, even if the other vehicle has further moved to the rear undetectable area of the vehicle, notification is not executed. Therefore, a driver does not recognize that notification of the presence of another vehicle in the rear undetectable area of the vehicle is performed, and instead, can recognize that the rear cross traffic alert device cannot perform notification of the presence of another vehicle in an area (rear undetectable area) directly behind the vehicle.

According to the third aspect, the notification stop area is set to an area that is in the detection area and adjacent, in the width direction of the vehicle, to the rear undetectable area behind the vehicle. As a result, another vehicle always passes through the notification stop area of the vehicle before and after the other vehicle passes through the rear undetectable area from the detection area of the vehicle. Therefore, notification by the rear cross traffic alert device is not executed before and after the other vehicle passes through the rear undetectable area of the vehicle. Therefore, a driver can recognize that notification is not executed for the rear undetectable area of the vehicle.

According to the fourth aspect, even if another vehicle is detected in the notification target area of the vehicle, if the other vehicle is also detected at least in the notification stop area of the vehicle, notification is stopped. Therefore, if at least a part of the other vehicle has entered the notification stop area, even if the other part of the other vehicle is left in the notification target area, notification is not executed. Therefore, a situation does not occur in which, as in conventional case, even though a part of the other vehicle is present in the rear undetectable area, notification continues because the other part is left in the notification target area. Therefore, a driver can recognize that notification is not executed when another vehicle is present in the rear undetectable area of the vehicle.

According to the fifth aspect, when another vehicle approaching an area laterally behind the vehicle has moved from the notification stop area to the notification target area in the detection area laterally behind the vehicle, notification by the rear cross traffic alert device is started. Thus, notification having been stopped because another vehicle has been present in the notification stop area laterally behind the vehicle is started again when the other vehicle moves to the notification target area. Therefore, a driver can recognize that if another vehicle is present in the notification target area laterally behind the vehicle, notification of the presence of the other vehicle is performed.

According to the sixth aspect, when another vehicle is detected in the notification target area of the vehicle but not detected in the notification stop area, notification is started. Therefore, if at least a part of the other vehicle is left in the notification stop area, even if the other part of the other vehicle has entered the notification target area, notification is not executed. Therefore, a situation does not occur in which, as in conventional case, when a part of another vehicle has entered the notification target area, notification is started even though the other part of the other vehicle is left in the rear undetectable area. Therefore, a driver can recognize that notification is not executed when another vehicle is present in the rear undetectable area of the vehicle.

According to the seventh aspect, in the case where there are a plurality of objects, even if one object is present in an area (an area including the notification stop area) in which notification is to be stopped, if the other objects are present in an area (an area including the notification target area but not including the notification stop area) in which notification is to be started, notification continues. Therefore, in the case where there are a plurality of objects, the fact that an object is present in an area in which notification is to be started is prioritized, whereby notification continues. Thus, a driver is properly notified of the presence of the other vehicle.

According to the eighth aspect, when another vehicle enters the rear undetectable area behind the vehicle from the notification target area laterally behind the vehicle, the vehicle passes from the notification target area through the notification stop area to enter the rear undetectable area. Therefore, when another vehicle enters the rear undetectable area of the vehicle, notification having been executed is stopped when the other vehicle passes through the notification stop area. Thus, it can be more reliably recognized that notification is not executed when the other vehicle enters the rear undetectable area.

As described above, according to the rear cross traffic alert device of the present invention, a driver is allowed to understand that notification of the presence of an object (another vehicle, etc.) in an area (rear undetectable area) directly behind the vehicle cannot be performed.

BRIEF DESCRIPTION OF THE DRAWINGS

FIG. 8 is a conventional diagram showing conventional notification control.

DESCRIPTION OF EMBODIMENTS

Figure 1:
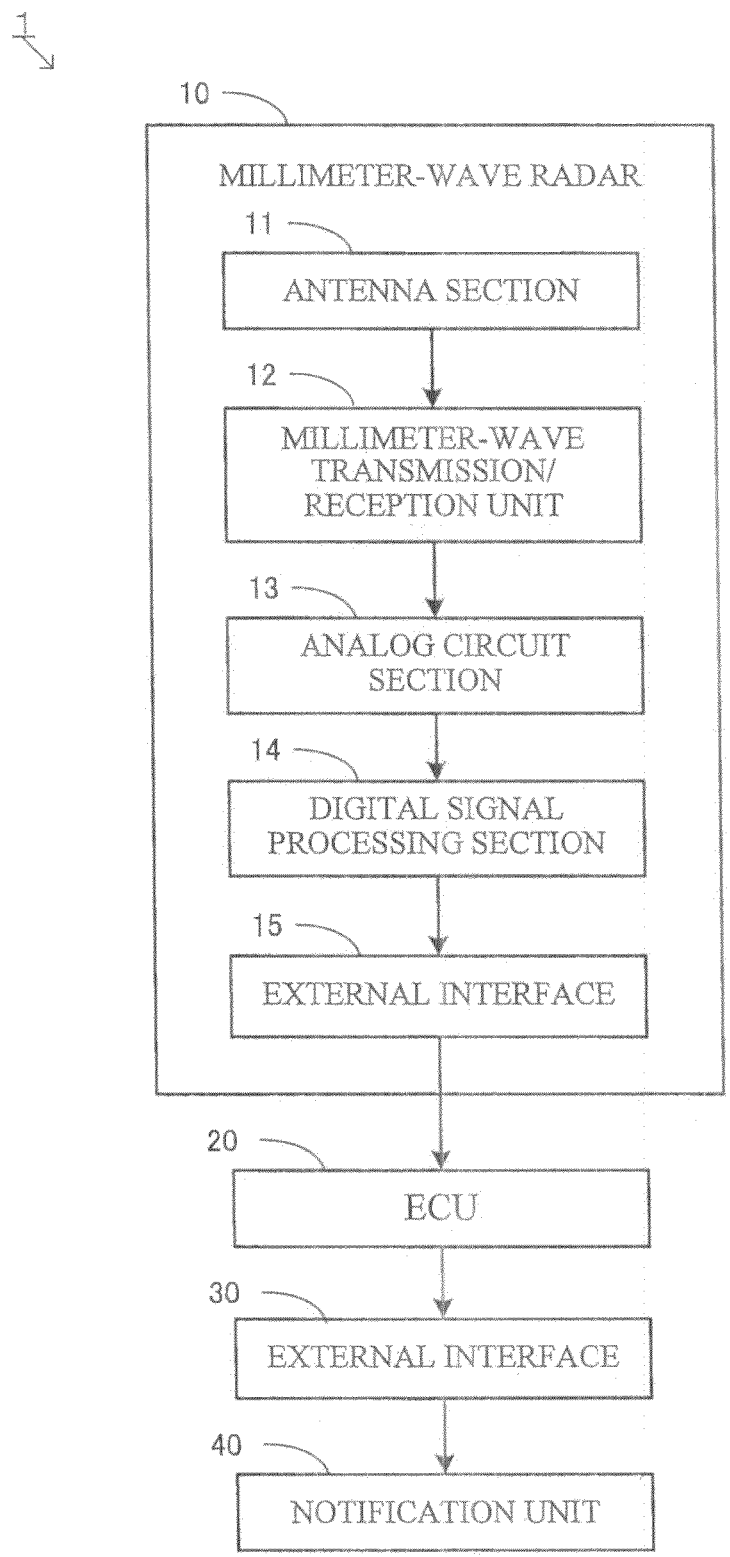
FIG. 1 is a block diagram showing an example of the configuration of a rear cross traffic alert device 1 according to an embodiment of the present invention.

Hereinafter, with reference to the drawings, a rear cross traffic alert device according to one embodiment of the present invention will be described. It is noted that the rear cross traffic alert device according to the present embodiment is provided on a vehicle, detects an object (another vehicle, etc.) in a right/left area laterally behind the vehicle, and performs notification of the presence of the object in a notification area. FIG. 1 is a block diagram showing an example of the configuration of the rear cross traffic alert device 1 according to the embodiment of the present invention.

With reference to FIG. 1, the configuration of the rear cross traffic alert device 1 will be described. As shown in FIG. 1, the rear cross traffic alert device 1 according to the present embodiment includes a millimeter-wave radar 10, an ECU (Electronic Control Unit) 20, an external interface 30, and a notification unit 40.

The millimeter-wave radar 10 is placed at a predetermined position on the vehicle 100 (for example, incorporated into right and left side mirrors, a fender body, or a rear bumper of the vehicle 100), and detects an object present at the right or left laterally behind the vehicle 100. The millimeter-wave radar 10 radiates a millimeter wave (electromagnetic wave) in a lateral direction from the vehicle 100, and detects an object (another vehicle, a bicycle, a guardrail, a traffic sign, or the like) present in a detection range (in a radiation range of the electromagnetic wave) of the millimeter-wave radar 10.

In more detail, as shown in FIG. 1, the millimeter-wave radar 10 includes an antenna section 11, a millimeter-wave transmission/reception unit 12, an analog circuit section 13, a digital signal processing section 14, and an external interface 15.

The antenna section 11 is, for example, a planar antenna. The millimeter-wave transmission/reception unit 12 is connected to the antenna section 11. The millimeter-wave transmission/reception unit 12 is composed of a frequency multiplier, a mixer, an amplifier circuit, and the like. The antenna section 11 and the millimeter-wave transmission/reception unit 12 transmit or receive, as a radar wave, a millimeter-wave of 24 GHz to 25 GHz, for example.

The analog circuit section 13 executes predetermined analog signal processing for a signal received by the millimeter-wave transmission/reception unit 12, and outputs the signal processed by the signal processing to the digital signal processing section 14. The digital signal processing section 14 performs AD conversion for an inputted beat signal of radar, performs frequency analysis by a DSP circuit, and calculates information such as the distance, the relative velocity, and the angle of an object with reference to the vehicle, thereby detecting the position of the object, and outputs the position information about the object to the ECU 20 via the external interface 15.

It is noted that the millimeter-wave radar 10 outputs the detection information about every individual detected object. Therefore, in the case where the millimeter-wave radar 10 has detected a plurality of objects, the millimeter-wave radar 10 outputs information (position information) about the object detection individually object by object, to the ECU 20.

The ECU 20 executes notification control for controlling start and stop of notification based on the position information about an object inputted from the millimeter-wave radar 10. The ECU 20 outputs an execution instruction and a stopping instruction of notification to the notification unit 40 via the external interface 30. It is noted that the details of the notification control will be described later.

The notification unit 40 visually or aurally notifies a driver of the presence of an object. The notification unit 40 is a display device such as a warning lamp or an alert device such as a warning buzzer, for example. For example, based on an execution instruction of notification from the ECU 20, the warning lamp lights up and alert sound of the warning buzzer is outputted, and based on a stopping instruction of notification, the warning lamp is extinguished and alert sound of the warning buzzer is stopped.

Figure 2:
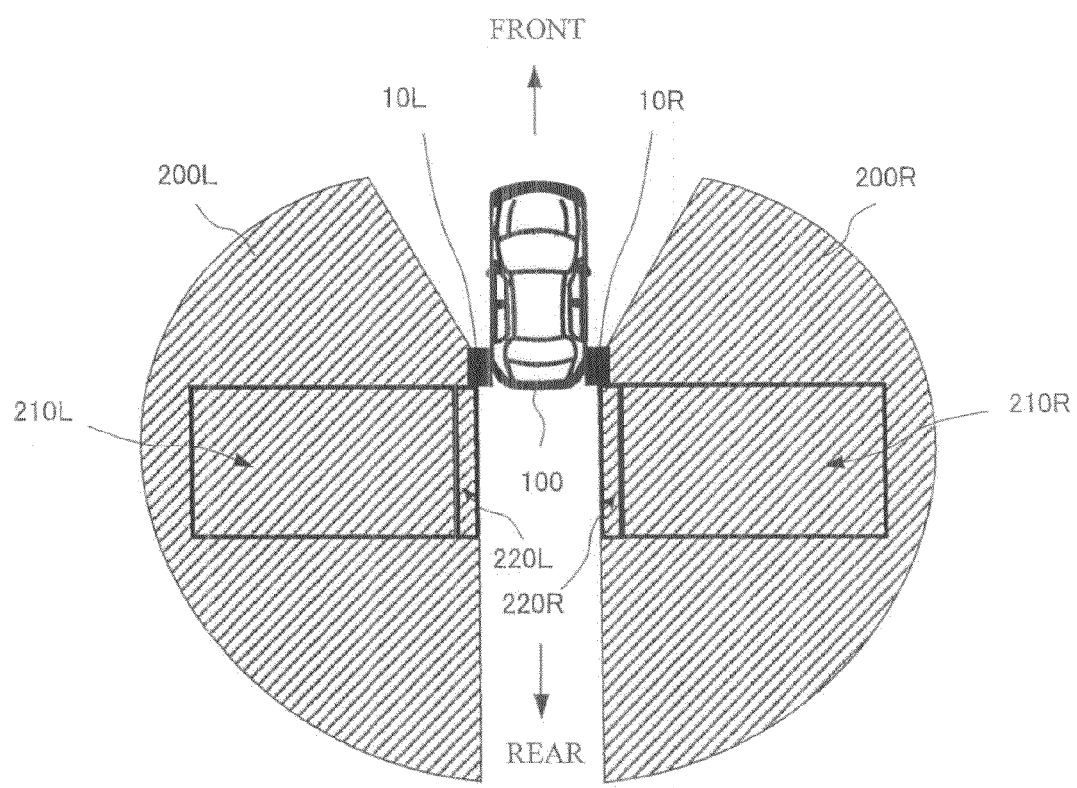
FIG. 2 is a diagram showing an example of a detection area 200 for which a millimeter-wave radar 10 performs detection, a notification target area 210, and a notification stop area 220.

Next, with reference to FIG. 2, a detection area in which the millimeter-wave radar 10 can detect an object will be described. FIG. 2 is a diagram showing an example of the detection area of the millimeter-wave radar 10, and a notification target area and a notification stop area.

As shown in FIG. 2, in the one embodiment of the present invention, the millimeter-wave radar 10 is embedded in the rear bumper at the right and left rear sides of the vehicle 100 (a millimeter-wave radar at the right is referred to as a right millimeter-wave radar 10R and a millimeter-wave radar at the left is referred to as a left millimeter-wave radar 10L). Since the millimeter-wave radar 10 is intended to detect an object at the right or left laterally behind the vehicle 100, the millimeter-wave radar 10 is provided on a rear side member of the vehicle 100 and radiates a millimeter wave in a lateral direction from the vehicle 100. Therefore, an area in which the left millimeter-wave radar 10L can detect an object (an area for which a millimeter wave can be radiated) is, for example, a left detection area 200L (a shaded area in FIG. 2) represented by a detection width (a detection angle range; for example, 150 degrees) from back of the vehicle 100 to left front of the vehicle 100. Similarly, an area in which the right millimeter-wave radar 10R can detect an object is, for example, a right detection area 200R (a shaded area in FIG. 2) represented by a detection width (a detection angle range; for example, 150 degrees) from back of the vehicle 100 to right front of the vehicle 100. That is, the millimeter-wave radar 10 cannot detect an area directly behind the vehicle 100.

In addition, although described later in detail, as shown in FIG. 2, the ECU 20 sets a left notification target area 210L and a left notification stop area 220L in the left detection area 200L, and sets a right notification target area 21 OR and a right notification stop area 220R in the right detection area 200R. It is noted that in the following description, when the detection area 200 is referred to, the detection area 200 means both the left detection area 200L and the right detection area 200R, when the notification target area 210 is referred to, the notification target area 210 means both the left notification target area 210L and the right notification target area 210R, and when the notification stop area 220 is referred to, the notification stop area 220 means both the left notification stop area 220L and the right notification stop area 220R. Here, when an object is detected in the notification target area 210 by the millimeter-wave radar 10 but is not detected in the notification stop area 220, notification of the presence of the object is executed by the notification unit 40, and when an object is detected in the notification stop area 220 by the millimeter-wave radar 10, the notification by the notification unit 40 is stopped.

Figure 3:
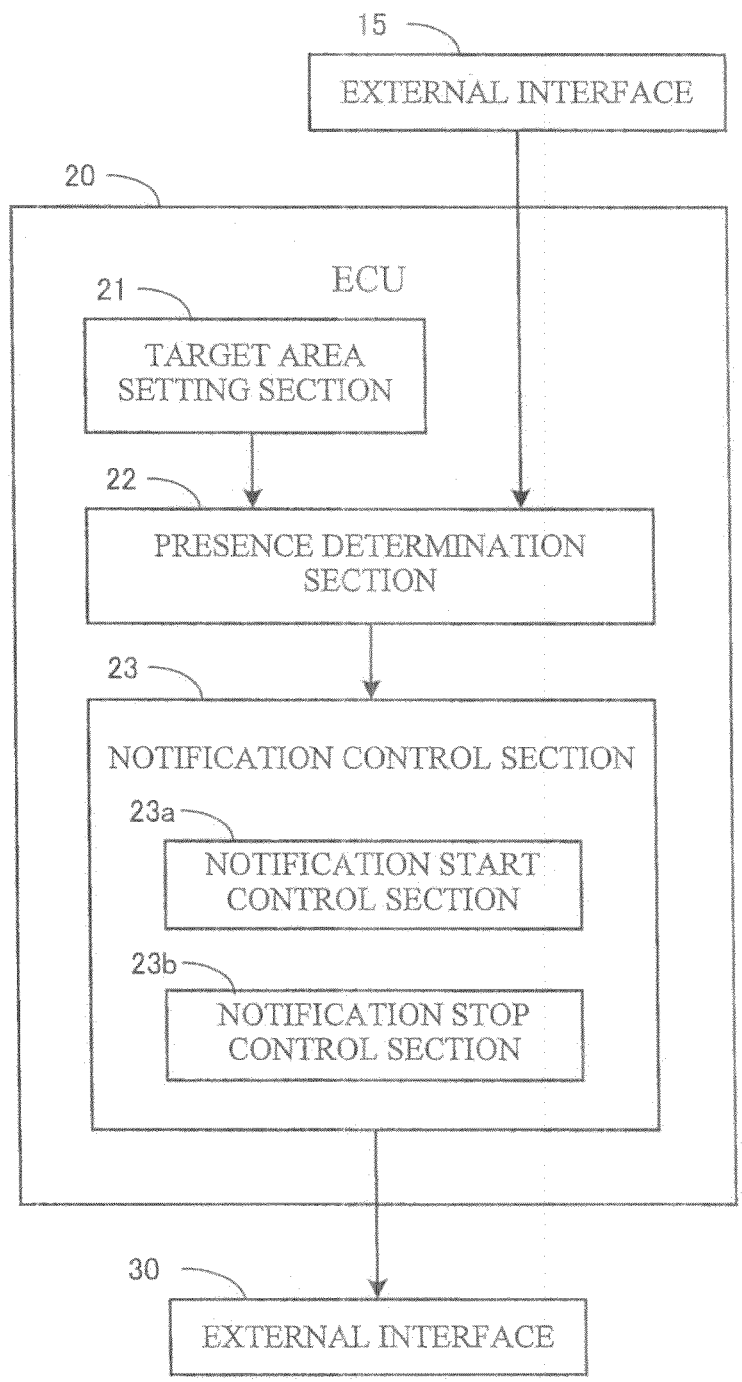
FIG. 3 is a block diagram showing an example of the configuration of an ECU 20.

Next, with reference to FIG. 3, the configuration of the ECU 20 will be described. FIG. 3 is a block diagram showing an example of the configuration of the ECU 20. The ECU 20 includes a microcomputer having a CPU, a ROM, a RAM, and the like, for example, thereby having, as its functions, a target area setting section 21, a presence determination section 22, and a notification control section 23. The ECU 20 of the rear cross traffic alert device 1 causes the CPU to execute a control program stored in advance in the above-described ROM, for example, thereby operating as the target area setting section 21, the presence determination section 22, and the notification control section 23.

The target area setting section 21 sets the notification target area 210 and the notification stop area 220 described with reference to FIG. 2. Specifically, the target area setting section 21 sets the notification target area 210 at a position that is likely to be a dead area for a driver in a right/left area laterally behind the vehicle 100 within the detection area 200 for which the millimeter-wave radar 10 performs detection. The notification target area 210 is set as an area that is likely to be a dead area due to a pillar of the vehicle 100 or an area that is difficult to view by an eye, for example. Since the position of a pillar or the area that is difficult to view by an eye differs among vehicles, the notification target area 210 is set in accordance with the characteristic of each vehicle. In addition, the target area setting section 21 sets the notification stop area 220 at a position in back of the vehicle 100, between an area (hereinafter, referred to as a rear undetectable area) in which the millimeter-wave radar 10 cannot detect an object and the notification target area 210, the position being adjacent to these areas in the width direction of the vehicle (see FIG. 2). Then, the target area setting section 21 outputs information indicating the set notification target area 210 and the set notification stop area 220 to the presence determination section 22.

The presence determination section 22 determines whether or not an object (a part thereof) is present in the notification target area 210 and/or the notification stop area 220, based on the position information about the object inputted via the external interface 15 and the information indicating the notification target area 210 and the notification stop area 220 outputted from the target area setting section 21. Then, the presence determination section 22 outputs information indicating the determination result to the notification control section 23. It is noted that the presence determination section 22 also functions as a movement determination section of the present invention.

The notification control section 23 has, as its functions, a notification start control section 23a and a notification stop control section 23b.

The notification start control section 23a outputs information for instructing the notification unit 40 to start notification, to the notification unit 40 via the external interface 30, based on the information indicating the determination result outputted from the presence determination section 22. Specifically, when the presence determination section 22 has determined that an object is present in the notification target area 210 but not in the notification stop area 220, the notification start control section 23a instructs the notification unit 40 to start notification.

The notification stop control section 23b outputs information instructing the notification unit 40 to stop notification, to the notification unit 40 via the external interface 30, based on the information indicating the determination result outputted from the presence determination section 22. Specifically, when the presence determination section 22 has determined that an object having been determined to be present in the notification target area 210 but not in the notification stop area 220 is present in both areas of the notification target area 210 and the notification stop area 220 (that is, it is determined that the object has entered the notification stop area 220 from the notification target area 210), or when the presence determination section 22 has determined that an object having been determined to be present in the notification target area 210 but not in the notification stop area 220 is present in an area other than the notification target area 210 and the notification stop area 220 (that is, it is determined that the object has completely moved out of the notification target area 210), the notification stop control section 23b instructs the notification unit 40 to stop notification.

Next, before describing the notification control of the rear cross traffic alert device 1 according to the present embodiment, conventional notification control will be described with reference to FIG. 8. FIG. 8 is a diagram showing conventional notification control in the case where another vehicle passes from the left laterally behind the vehicle to the right laterally behind the vehicle.

As shown in FIG. 8, according to the conventional notification control, in the case where another vehicle passes from the left laterally behind the vehicle to the right laterally behind the vehicle, when the other vehicle enters a notification target area at the left laterally behind the vehicle, a rear cross traffic alert device provided on the vehicle performs notification of the presence of the other vehicle (see FIG. 8(1)). Then, the notification continues to be executed until the other vehicle moves out of the notification target area of the vehicle. Therefore, just before the other vehicle moves out of the notification target area, a situation occurs in which the notification continues though the other vehicle has moved to a position directly behind the vehicle (see FIG. 8(2)). Therefore, a driver might recognize that the rear cross traffic alert device can also detect the presence of another vehicle directly behind the vehicle and perform notification thereof.

Figure 4:
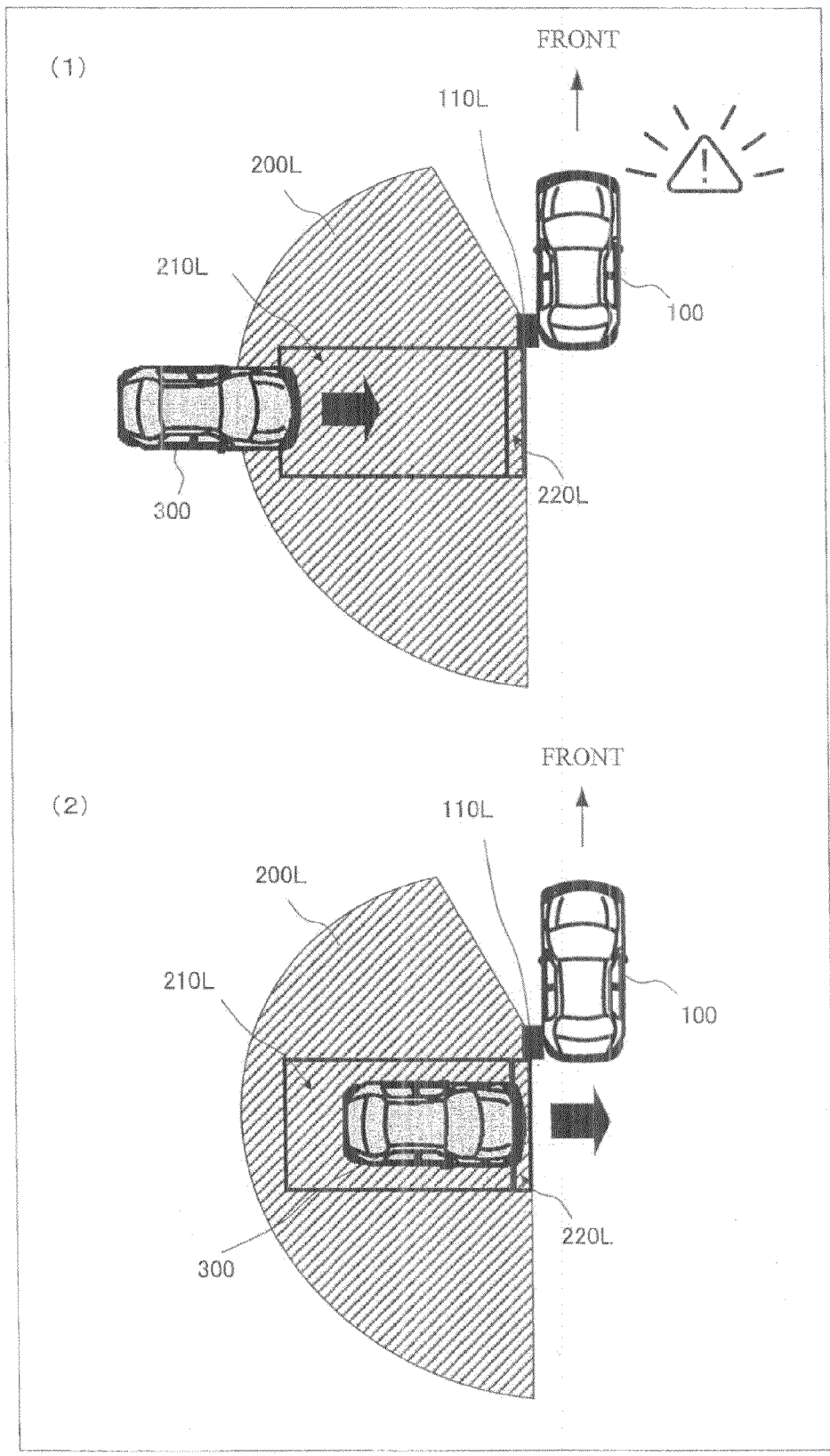
FIG. 4 is a diagram showing notification control executed by the rear cross traffic alert device 1 in the case where another vehicle 300 crosses behind the vehicle 100.
Figure 5:
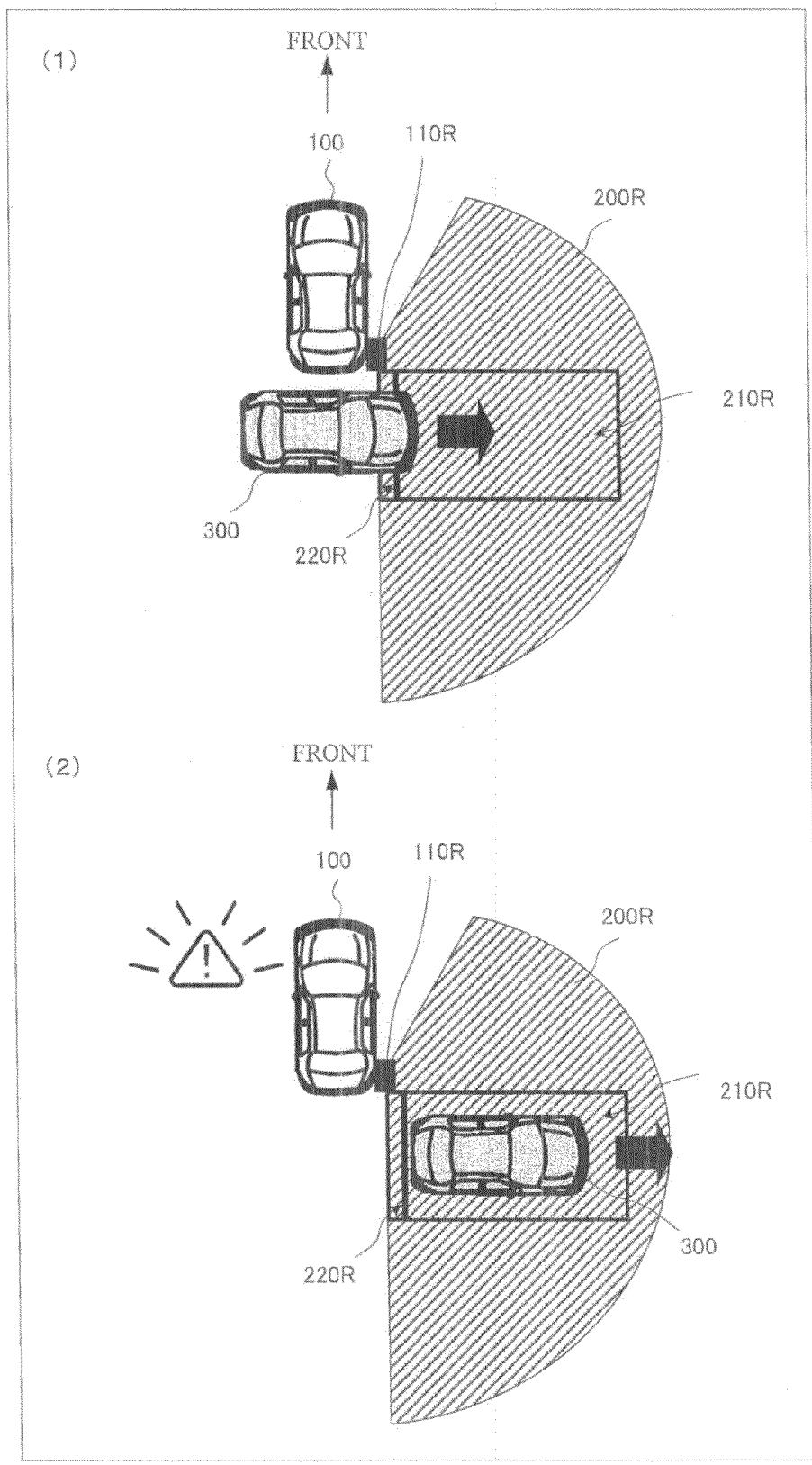
FIG. 5 is a diagram showing notification control executed by the rear cross traffic alert device 1 in the case where another vehicle 300 crosses behind the vehicle 100.
Figure 6:
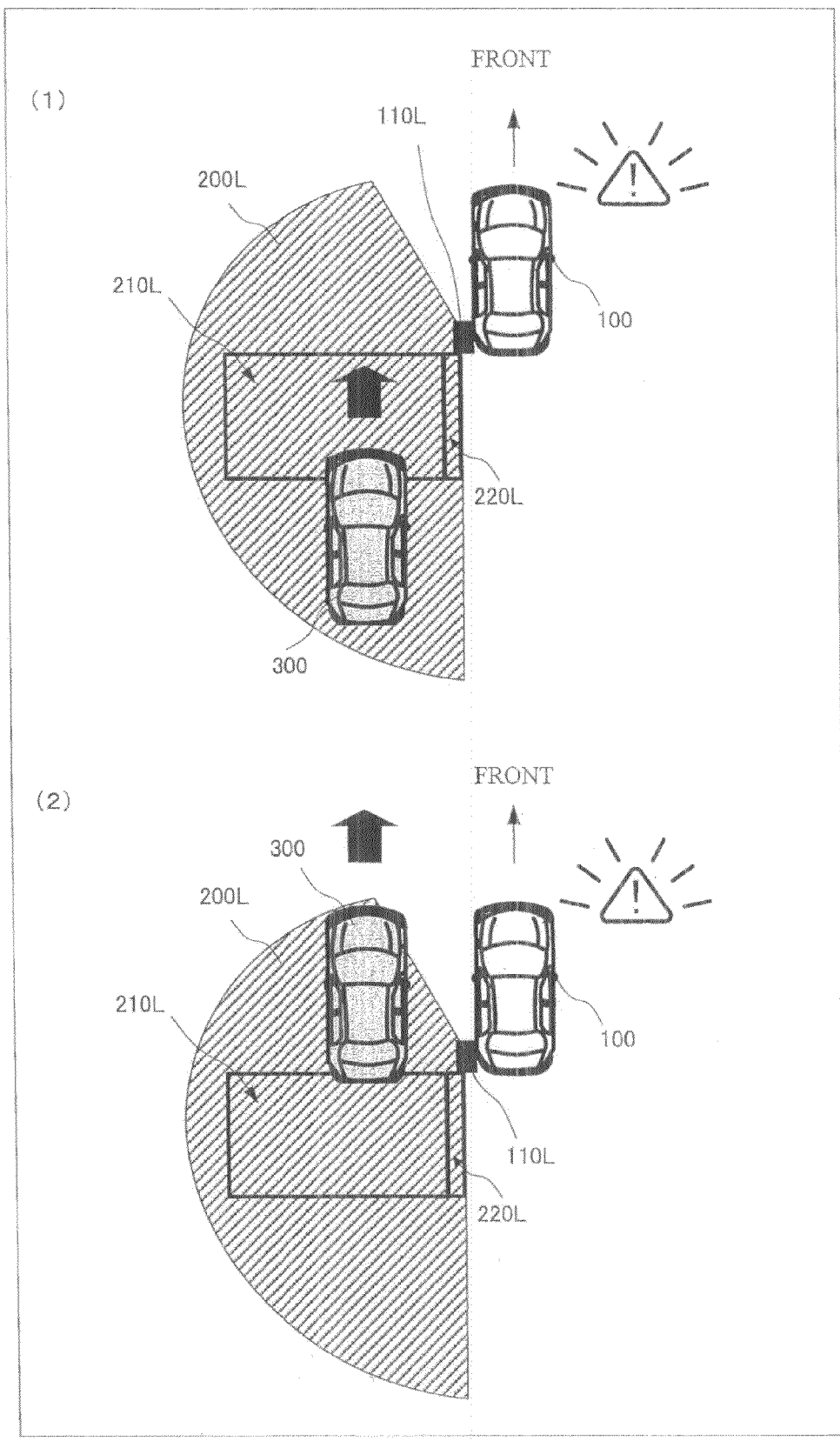
FIG. 6 is a diagram showing notification control executed by the rear cross traffic alert device 1 in the case where another vehicle 300 passes through an area lateral to the vehicle 100.

Next, with reference to FIG. 4 to FIG. 7, the notification control of the rear cross traffic alert device 1 according to the present embodiment will be described. FIG. 4 and FIG. 5 are diagrams showing the notification control executed by the rear cross traffic alert device 1 in the case where another vehicle 300 passes from the left laterally behind the vehicle 100 to the right laterally behind the vehicle 100 (crosses an area behind the vehicle 100). FIG. 6 is a diagram showing the notification control executed by the rear cross traffic alert device 1 in the case where another vehicle 300 passes from back to front through a left area lateral to the vehicle 100.

As shown in FIG. 4 and FIG. 5, in the case where another vehicle 300 passes from the left laterally behind the vehicle 100 to the right laterally behind the vehicle 100, first, when the other vehicle 300 enters the left notification target area 210L at the left laterally behind the vehicle 100, the rear cross traffic alert device 1 performs notification of the presence of the other vehicle 300 (see FIG. 4(1)). Next, when the other vehicle 300 enters, from the left notification target area 210L, the left notification stop area 220L adjacent to the left notification target area 210L in the width direction of the vehicle 100, the rear cross traffic alert device 1 stops the notification of the presence of the other vehicle 300 (see FIG. 4(2)). Then, when the other vehicle 300 further moves to reach the rear undetectable area directly behind the vehicle 100, the notification is not executed.

Next, the other vehicle 300 enters the right notification stop area 220R from the rear undetectable area, and then enters the right notification target area 210R (see FIG. 5(1)). At this time, as shown in FIG. 5(1), the rear cross traffic alert device 1 does not start notification of the present of the other vehicle 300 until the other vehicle 300 completely passes through the right notification stop area 220R. Next, when the other vehicle 300 has completely passed through the right notification stop area 220R so that the other vehicle 300 is detected only in the right notification target area 210R, the rear cross traffic alert device 1 starts notification of the presence of the other vehicle 300 (see FIG. 5(2)).

As described above, in the case where another vehicle 300 passes from the left laterally behind the vehicle 100 to the right laterally behind the vehicle 100, notification is not executed while the other vehicle 300 is passing through the notification stop area 220, and notification is executed only when the other vehicle 300 is not passing through the notification stop area 220. Further, since the notification stop area 220 is set so as to be adjacent to the rear undetectable area in the width direction of the vehicle 100, notification is not executed when the other vehicle 300 is present near the rear undetectable area. In addition, as described above, in the case where the other vehicle 300 passes from the left laterally behind the vehicle 100 to the right laterally behind the vehicle 100, when the other vehicle 300 has reached an area directly behind the vehicle 100, the notification having been performed thus far is stopped. Therefore, a driver can recognize that notification is not executed when another vehicle 300 is present directly behind the vehicle 100 (present in the rear undetectable area).

Next, with reference to FIG. 6, the notification control executed by the rear cross traffic alert device 1 in the case where another vehicle 300 passes from back to front through a left area lateral to the vehicle 100 will be described. First, the other vehicle 300 enters, from behind, the left notification target area 210L present at the left laterally behind the vehicle 100 (see FIG. 6(1)). At this time, the rear cross traffic alert device 1 starts notification of the presence of the other vehicle 300. Next, the other vehicle 300 travels forward to pass through the left notification target area 210L forward. Here, just before the other vehicle 300 exits the left notification target area 210L forward, the notification is still being executed (see FIG. 6(2)). Therefore, for example, in such a case where another vehicle 300 passes through an area lateral to the vehicle 100, notification of the presence of the other vehicle 300 passing through a blind spot for the vehicle 100 is properly performed as in the conventional case. It is noted that the positions and the sizes of the notification target area 210 and the notification stop area 220 are set such that notification of the other vehicle 300 passing through an area lateral to the vehicle 100 can be thus accurately performed.

Figure 7:
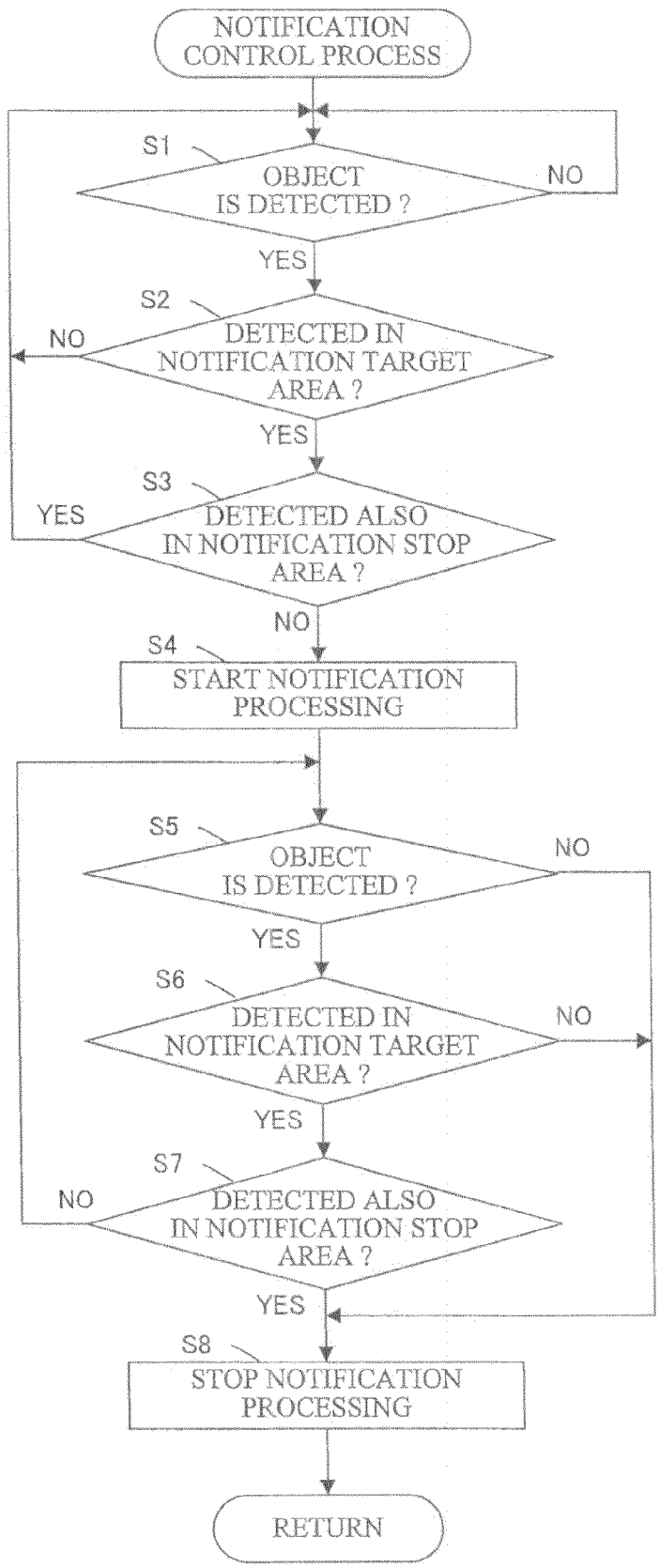
FIG. 7 is an example of a flowchart showing the details of notification control processing executed by the rear cross traffic alert device 1.

Hereinafter, with reference to FIG. 7, the notification control process executed by the rear cross traffic alert device 1 described above will be described in detail. FIG. 7 is an example of a flowchart showing the details of the process executed by each function section of the rear cross traffic alert device 1. The rear cross traffic alert device 1 starts the process of the flowchart in FIG. 7 when, for example, the IG power supply of the vehicle 100 is set to ON.

First, in step S1, the ECU 20 of the rear cross traffic alert device 1 determines whether or not an object (another vehicle, etc.) has been detected in the detection area 200. Specifically, the millimeter-wave radar 10 of the rear cross traffic alert device 1 detects an object present in the detection area 200, and outputs detection information (detected position information and information that no object is detected) to the ECU 20 via the external interface 15. Then, the presence determination section 22 of the ECU 20 acquires the detection information, and determines whether or not the position information about the detected object is included in the detection information. If the determination result is YES, the process proceeds to step S2. If the determination result is NO, the process returns to step S1. That is, the processing of step S1 is repeated until an object is detected in the detection area 200.

In step S2, the ECU 20 determines whether or not the detected object has been detected in the notification target area 210. Specifically, the presence determination section 22 of the ECU 20 acquires position information about the notification target area 210 set by the target area setting section 21, and compares the acquired information with the detection position of the detected object, thereby determining whether or not the object is present in the notification target area 210. If the determination result is YES, the process proceeds to step S3. If the determination result is NO, the process returns to step S1, to determine again whether or not an object is detected in the detection area 200, based on the next detection information acquired by the millimeter-wave radar 10.

That is, in step S2, if the object detected in the detection area 200 is not present in the notification target area 210, notification is not executed, and the detection processing (step S1) for the object is repeated until the object enters the notification target area 210. On the other hand, if the object is present in the notification target area 210, there is a possibility that notification processing is started, and therefore the process proceeds to subsequent step S3.

In step S3, the ECU 20 determines whether or not the detected object has been detected also in the notification stop area 220. Specifically, the presence determination section 22 of the ECU 20 acquires position information about the notification stop area 220 set by the target area setting section 21, and compares the acquired information with the detection position of the detected object, thereby determining whether or not the object is present in the notification stop area 220. If the determination result is NO, the process proceeds to step S4. If the determination result is YES, the process returns to step S1, to determine again whether or not an object is detected in the detection area 200, based on the next detection information acquired by the millimeter-wave radar 10.

That is, in step S3, if the object detected in the detection area 200 is detected in both the notification target area 210 and the notification stop area 220, notification is not performed, and the detection processing (steps S1 to S3) for the object is repeated until the object moves out of the notification stop area 220 to be positioned within the notification target area 210. This is understood by the situation described with reference to FIG. 5(1). That is, in the case where another vehicle 300 passes through the right notification stop area 220R of the vehicle 100 and enters the right notification target area 210R, the other vehicle 300 is detected in both the notification target area 210 and the notification stop area 220. At this time, notification by the rear cross traffic alert device 1 is not executed until the other vehicle 300 moves out of the right notification stop area 220R (see FIG. 5(2)). On the other hand, if the object is present in the notification target area 210 but not in the notification stop area 220, notification processing is to be started and therefore the process proceeds to subsequent step S4. This is understood by the situation described with reference to FIG. 4(1). That is, when another vehicle 300 enters the left notification target area 210L of the vehicle 100 but is not positioned in the left notification stop area 220L, notification is executed by the rear cross traffic alert device 1.

In step S4, the ECU 20 starts the notification processing. Specifically, the notification start control section 23a of the ECU 20 outputs information instructing the notification unit 40 to start notification, to the notification unit 40 via the external interface 30, based on information (information indicating that the object is present in the notification target area 210 but not in the notification stop area 220) indicating the determination result outputted from the presence determination section 22. As a result, the notification unit 40 starts to output alert sound, for example. Thereafter, the process proceeds to step S5. It is noted that processing of step S5 and subsequent steps is processing for stopping the started notification processing.

In step S5, the ECU 20 determines whether or not the object is detected in the detection area 200. Specifically, the millimeter-wave radar 10 of the rear cross traffic alert device 1 detects the object present in the detection area 200, and outputs detection information (detected position information and information that no object is detected) to the ECU 20 via the external interface 15. Then, the presence determination section 22 of the ECU 20 acquires the detection information, and determines whether or not the position information about the detected object is included in the detection information. If the determination result is YES, the process proceeds to step S6. If the determination result is NO, the process proceeds to step S8. That is, the object that has been detected in the notification target area 210 is now not detected in the detection area 200, and this means that the object has completely moved out of the notification target area 210. Therefore, the process proceeds to subsequent step S8 to stop the notification processing.

In step S6, the ECU 20 determines whether or not the detected object is detected in the notification target area 210. Specifically, the presence determination section 22 of the ECU 20 acquires position information about the notification target area 210 set by the target area setting section 21, and compares the acquired information with the detection position of the detected object, thereby determining whether or not the object is present in the notification target area 210. If the determination result is YES, the process proceeds to step S7. If the determination result is NO, the process proceeds to step S8.

That is, in step S6, whether or not the object having been detected in the notification target area 210 is still detected in the notification target area 210, is determined. If the object having been detected in the notification target area 210 is now not present in the notification target area 210, notification is not to be executed and therefore the process proceeds to step S8 to stop the notification processing. On the other hand, if the object is still present in the notification target area 210, there is a possibility that the notification processing continues (notification processing is not stopped), the process proceeds to subsequent step S7.

In step S7, the ECU 20 determines whether or not the detected object is detected also in the notification stop area 220. Specifically, the presence determination section 22 of the ECU 20 acquires position information about the notification stop area 220 set by the target area setting section 21, and compares the acquired information with the detection position of the detected object, thereby determining whether or not the object is present in the notification stop area 220. If the determination result is YES, the process proceeds to step S8. If the determination result is NO, the process returns to step S5, to determine again whether or not the object is detected in the detection area 200, based on the next detection information acquired by the millimeter-wave radar 10.

That is, in step S7, whether or not the object having been detected in the notification target area 210 has moved to be detected in both the notification target area 210 and the notification stop area 220, is determined. If the determination result is positive, processing of subsequent step S8 is executed to stop the notification processing. This is understood by the situation described with reference to FIG. 4(2). That is, while another vehicle 300 is moving in the left notification target area 210L of the vehicle 100, the notification continues, and then when the other vehicle 300 enters the left notification stop area 220L, the other vehicle 300 is detected in both the notification target area 210 and the notification stop area 220. At this time, the notification by the rear cross traffic alert device 1 is stopped. On the other hand, if the determination result is negative, the object having been detected in the notification target area 210 is still detected only in the notification target area 210, and therefore the notification processing continues.

In step S8, the ECU 20 stops the notification processing. Specifically, the notification stop control section 23b of the ECU 20 outputs information instructing the notification unit 40 to stop the notification, to the notification unit 40 via the external interface 30, based on information (information indicating that the object is not present in the detection area 200, the object is not present in the notification target area 210, or the object is present at least in the notification stop area 220) indicating the determination result outputted from the presence determination section 22. As a result, the output of alert sound by the notification unit 40 is stopped, for example. Thereafter, the process returns to the first step (step S1) of the notification control process.

It is noted that the above notification control process is executed for each of different objects. Therefore, it can be assumed that an instruction to start notification processing is given for one object while an instruction to stop notification processing is given for another object. In such a case, in overall notification control process, regarding the start of notification processing, if an instruction to start notification processing is given for at least one object, the notification processing may be started, and regarding the stop of notification processing, if an instruction to stop notification processing is given for all the objects, the notification processing may be stopped. Thus, even if one object is present in the notification stop area 220, if another object is present in the notification target area 210, notification is properly executed.

As described above, according to the rear cross traffic alert device 1 of the present embodiment, notification of the presence of another vehicle 300 passing in an area lateral to the vehicle 100 is reliably performed, and meanwhile, when the other vehicle 300 enters the rear undetectable area of the vehicle 100, the notification is stopped. Thus, a driver can understand that the rear cross traffic alert device 1 can detect (notify) an object present in an area laterally behind the vehicle 100 but cannot detect (notify) an object present in the rear undetectable area. As a result, for example, it is expected that the number of drivers who neglect looking behind when the vehicle is backed is decreased.

In the above embodiment, if the object moves out of the detection area 200 (NO in step S5 in FIG. 7), or if the object is not detected in the notification target area 210 (NO in step S6 in FIG. 7), the notification processing is stopped immediately (step S8 in FIG. 7). However, in these two cases, the notification processing may be stopped after the notification has continued for a predetermined time. Thus, for example, in such a case where another vehicle 300 travels in an area lateral to the vehicle 100 to overtake the vehicle 100 (see FIG. 6), the notification is not stopped immediately even after the other vehicle 300 has moved out of the notification target area 210 of the vehicle 100. Therefore, it is less likely to give a driver a feeling of anxiety about the presence of the other vehicle 300.

In addition, in the above embodiment, the shapes of the notification target area 210 and the notification stop area 220 in the detection area 200 are exemplified as a rectangular shape in FIG. 2, etc. However, the shapes are not limited thereto, but can be freely set. In addition, as exemplified in FIG. 2, etc., the notification target area 210 and the notification stop area 220 are adjacent to each other in the width direction of the vehicle 100. However, they may not necessarily be adjacent to each other. That is, as long as the notification stop area 220 is adjacent to the rear undetectable area of the vehicle 100 in the width direction of the vehicle 100, another vehicle 300 enters the notification stop area 220 before the other vehicle 300 enters the rear undetectable area from the detection area 200. Therefore, the notification is stopped, so that the notification is not executed when the other vehicle 300 has entered the rear undetectable area.

In addition, in the above embodiment, the millimeter-wave radar 10 is used for detection of another vehicle 300. However, the method for detecting another vehicle 300 is not limited to the millimeter-wave radar. For example, an image of the peripheral area laterally behind the vehicle 100 may be taken with a camera provided on the vehicle 100, and detection information about the other vehicle 300 may be acquired from the taken image.

In addition, the order of steps, values used in the determinations, and the like in the notification control process executed in the above embodiment are merely an example. It should be understood that the present invention can be realized even by another order or value within the scope of the present invention.

In addition, a program for each processing executed by the rear cross traffic alert device 1 in the above embodiment may be supplied to the rear cross traffic alert device 1 via a storage medium such as a nonvolatile memory, or may be supplied to the rear cross traffic alert device 1 via a communication line in a wired manner or a wireless manner. It is noted that the information storage medium for storing the program may be, instead of a nonvolatile memory, a CD-ROM, a DVD, an optical disc storage medium similar thereto, a flexible disk, a hard disk, an optical magnetic disk, a magnetic tape, etc.

While the invention has been described in detail, the foregoing description is in all aspects illustrative and not restrictive. It is understood that numerous other modifications and variations can be devised without departing from the scope of the invention.

INDUSTRIAL APPLICABILITY

The rear cross traffic alert device according to the present invention is beneficial as an apparatus for notifying a driver of the presence of another vehicle in an area (blind spot) that is a dead area for the driver, etc.

DESCRIPTION OF THE REFERENCE CHARACTERS

1 rear cross traffic alert device
10 millimeter-wave radar
11 antenna section
12 millimeter-wave transmission/reception unit
13 analog circuit section
14 digital signal processing section
15 external interface
20 ECU
21 target area setting section
22 presence determination section
23 notification control section
23a notification start control section
23b notification stop control section
30 external interface
40 notification unit
100 vehicle
200 detection area
210 notification target area
220 notification stop area
300 another vehicle

The invention claimed is:

1. A rear cross traffic alert device provided on a vehicle, for notifying the presence of an object approaching an area laterally behind the vehicle, the rear cross traffic alert device comprising:
   an object detection section configured to detect the presence of the object present laterally behind the vehicle;
   a target area setting section configured to set a notification target area and a notification stop area such that the notification target area and the notification stop area are aligned in the width direction of the vehicle and behind the vehicle in a detection area in which the object detection section can detect the presence of the object;
   a movement determination section configured to determine whether or not the object has entered the notification target area or the notification stop area; and
   a notification control section configured to start notification when the movement determination section has determined that the object has entered the notification target area, and stop notification when the movement determination section has determined that the object has entered the notification stop area from the notification target area.

2. The rear cross traffic alert device according to claim 1, wherein
   the target area setting section sets the notification stop area between the notification target area and a rear undetectable area behind the vehicle in which the object detection section cannot detect the presence of the object.

3. The rear cross traffic alert device according to claim 1, wherein
   the movement determination section determines that the object has entered the notification stop area from the notification target area, when the object having been detected in the notification target area and not having been detected in the notification stop area is detected at least in the notification stop area.

4. The rear cross traffic alert device according to claim 1, wherein
the notification control section restarts notification when the movement determination section has determined that the object has moved out of the notification stop area and completely moved into the notification target area.

5. The rear cross traffic alert device according to claim 4, wherein
the movement determination section determines that the object has moved out of the notification stop area and completely moved into the notification target area, when the object having been detected at least in the notification stop area is detected in the notification target area and not detected in the notification stop area.

6. The rear cross traffic alert device according to claim 1, wherein
when the object detection section has detected a plurality of different objects, the movement determination section determines, for each object, whether or not the object is detected in the notification target area and not detected in the notification stop area, and
the notification control section does not stop notification when the movement determination section has determined that at least one of the plurality of objects is detected in the notification target area and not detected in the notification stop area.

7. The rear cross traffic alert device according to claim 2, wherein
the target area setting section sets the notification stop area such that the notification stop area is adjacent to both the notification target area and the rear undetectable area.

8. A notification control method in a rear cross traffic alert device provided on a vehicle for notifying the presence of an object approaching an area laterally behind the vehicle, the notification control method comprising:
an object detection step of detecting the presence of the object present laterally behind the vehicle;
a movement determination step of determining whether or not the object has entered notification target area or a notification stop area, the notification target area and the notification stop area being set so as to be aligned in the width direction of the vehicle and behind the vehicle in a detection area in which the presence of the object can be detected in the object detection step; and
a notification control step of starting notification when the movement determination step has determined that the object has entered the notification target area, and stopping notification when the movement determination step has determined that the object has entered the notification stop area from the notification target area.

* * * * *